US009786328B2

(12) United States Patent
Lee et al.

(10) Patent No.: US 9,786,328 B2
(45) Date of Patent: Oct. 10, 2017

(54) METHODS AND SYSTEMS FOR PREVIEWING A RECORDING

(71) Applicant: DISCOVERY COMMUNICATIONS, LLC, Silver Spring, MD (US)

(72) Inventors: Andrew B. Lee, Brooklyn, NY (US); Joel Fiser, Pylesville, MD (US)

(73) Assignee: Discovery Communications, LLC, Silver Spring, MD (US)

( * ) Notice: Subject to any disclaimer, the term of this patent is extended or adjusted under 35 U.S.C. 154(b) by 341 days.

(21) Appl. No.: 14/151,579

(22) Filed: Jan. 9, 2014

(65) Prior Publication Data
US 2014/0201638 A1 Jul. 17, 2014

Related U.S. Application Data

(60) Provisional application No. 61/752,338, filed on Jan. 14, 2013.

(51) Int. Cl.
*G06F 3/0484* (2013.01)
*G11B 27/34* (2006.01)

(52) U.S. Cl.
CPC .................................. *G11B 27/34* (2013.01)

(58) Field of Classification Search
CPC .......... G06F 3/00; G06F 3/016; G06F 3/0202; G06F 3/048; G06F 3/0481; G06F 3/04812; G06F 3/04817; G06F 3/04842; G06F 3/03543; G06F 3/03545; G06F 1/1626; G06F 9/4446; G11B 27/34; H04N 5/44543; H04N 21/472; H04N 21/482
See application file for complete search history.

(56) References Cited

U.S. PATENT DOCUMENTS

| 8,332,530 | B2 * | 12/2012 | Wei | G06F 3/0481 |
| | | | | 707/769 |
| 8,418,082 | B2 * | 4/2013 | Meaney | G11B 27/34 |
| | | | | 386/278 |
| 8,943,410 | B2 * | 1/2015 | Ubillos | G06F 3/0481 |
| | | | | 707/E17.009 |
| 9,032,297 | B2 * | 5/2015 | Lovejoy | G11B 27/034 |
| | | | | 715/723 |
| 2003/0142123 | A1 * | 7/2003 | Malamud | G06F 3/04812 |
| | | | | 715/715 |
| 2006/0224940 | A1 * | 10/2006 | Lee | G11B 27/34 |
| | | | | 715/203 |
| 2009/0183078 | A1 * | 7/2009 | Clement | G11B 27/34 |
| | | | | 715/723 |
| 2010/0037267 | A1 * | 2/2010 | Bennett | H04N 7/165 |
| | | | | 725/56 |
| 2011/0052144 | A1 * | 3/2011 | Abbas | G11B 27/034 |
| | | | | 386/240 |

(Continued)

*Primary Examiner* — Xiomar L Bautista
(74) *Attorney, Agent, or Firm* — Bookoff McAndrews, PLLC

(57) ABSTRACT

Certain aspects of the present disclosure relate to methods and systems for previewing a recording. In one aspect, the methods and systems are configured to display a video recording/stream in a first viewing window on a display, receive a selection of a time within the video recording/stream at which to preview a portion of the video recording/stream, display a second viewing window on the display, and display the preview of the portion of the video recording/stream that corresponds to the selection within the second viewing window.

12 Claims, 4 Drawing Sheets

(56) References Cited

U.S. PATENT DOCUMENTS

| | | | | |
|---|---|---|---|---|
| 2012/0174010 A1* | 7/2012 | Flint | ................... | G06F 3/0482 |
| | | | | 715/769 |
| 2012/0210230 A1* | 8/2012 | Matsuda | .............. | G11B 27/034 |
| | | | | 715/723 |
| 2012/0213495 A1* | 8/2012 | Hafeneger | ........... | G11B 27/034 |
| | | | | 386/282 |
| 2012/0221383 A1* | 8/2012 | Shore | .................. | G11B 27/034 |
| | | | | 705/14.1 |
| 2012/0321280 A1* | 12/2012 | Lin | .................... | G11B 27/105 |
| | | | | 386/240 |

\* cited by examiner

METHODS AND SYSTEMS FOR PREVIEWING A RECORDING

CLAIM FOR PRIORITY UNDER 35 U.S.C. §119

The present Application for Patent claims priority to Provisional Application No. 61/752,338 entitled "METHODS AND SYSTEMS FOR PREVIEWING A RECORDING" filed Jan. 14, 2013, and assigned to the assignee hereof and hereby expressly incorporated by reference herein.

BACKGROUND OF THE INVENTION

1. Field of Invention

Aspects of the present invention relate to methods and systems for providing a preview of a video recording or video stream to a user. More particularly, aspects of the present invention relate to methods and systems for providing a preview of a video recording or video stream to a user in the form of a shorter video recording of the content at a user-selected location.

2. Description of Related Art

Users of video recordings or video streams on an electronic device who desire to skip to specific parts of the recording/stream currently only have the option of either viewing the recording/stream until the desired portion appears, skipping to an unknown location by using a forward or rewind button of a video player on the electronic device used to view the video recording/stream, or placing a cursor of an electronic input device over various portions of a time bar of the video recording/stream to preview a still image of the corresponding portion of the recording/stream.

For example, U.S. Pat. No. 8,230,343 teaches a system for utilizing metadata created either at a central location for shared use by connected users, or at each individual user's location, and is incorporated herein in its entirety by reference.

However, even when a user is able to view a still image of a later or earlier portion a video recording/stream being viewed, the user cannot know with certainty whether the still image corresponds to the desired location of the recording/stream the user is attempting to watch.

Accordingly, there is a need in the art for methods and systems to provide a user with a more accurate way to locate a specific portion of the video recording/stream than just providing a still image when the user places the cursor of the electronic device used to view the recording/stream at a later point in time on the time bar of the recording/stream.

SUMMARY OF THE INVENTION

In light of the above described problems and unmet needs, aspects of the present invention provide systems and methods for providing the user of a video recording/stream in a first viewing window of an electronic device with the ability, while concurrently viewing the recording/stream, to select a time of the video recording/stream to view a preview of a portion of the video recording/stream in a second viewing window of the electronic device, the preview corresponding to a later or earlier point in time of the video recording/stream.

According to the various aspects, a method of displaying a preview of a portion of a video recording/stream is disclosed, comprising displaying a video recording/stream in a first viewing window on a display, receiving a selection of a time within the video recording/stream at which to preview a portion of the video recording/stream, displaying a second viewing window on the display, and displaying the preview of the portion of the video recording/stream that corresponds to the selected time within the second viewing window.

Further according to various aspects, a system for displaying a preview of a portion of a video recording/stream is disclosed, wherein the system comprises, a processor, a user interface functioning via the processor, and a repository accessible by the processor. In an aspect, the processor of the system is configured to display a video recording/stream in a first viewing window on a display, receive a selection of a time within the video recording/stream at which to preview a portion of the video recording/stream, display a second viewing window on the display, and display the preview of the portion of the video recording/stream that corresponds to the selected time within the second viewing window.

Still further according to the various aspects, a computer program product comprising a non-transitory computer usable medium having control logic stored therein for causing an electronic device to display a preview of a portion of a video recording/stream is disclosed. In an aspect, the control logic comprises computer readable program code means for displaying a video recording/stream in a first viewing window on a display, computer readable program code means for receiving a selection of a time within the video recording/stream at which to preview a portion of the video recording/stream, computer readable program code means for displaying a second viewing window on the display, and computer readable program code means for displaying the preview of the portion of the video recording/stream that corresponds to the selected time within the second viewing window.

Additional advantages and novel features of these aspects of the invention will be set forth in part in the description that follows, and in part will become more apparent to those skilled in the art upon examination of the following or upon learning by practice of the invention.

BRIEF DESCRIPTION OF THE DRAWINGS

Various examples and aspects of the systems and methods will be described in detail, with reference to the following figures, wherein.

DETAILED DESCRIPTION

These and other features and advantages of this invention are described in, or are apparent from, the following detailed description of various example aspects.

Figure 1:
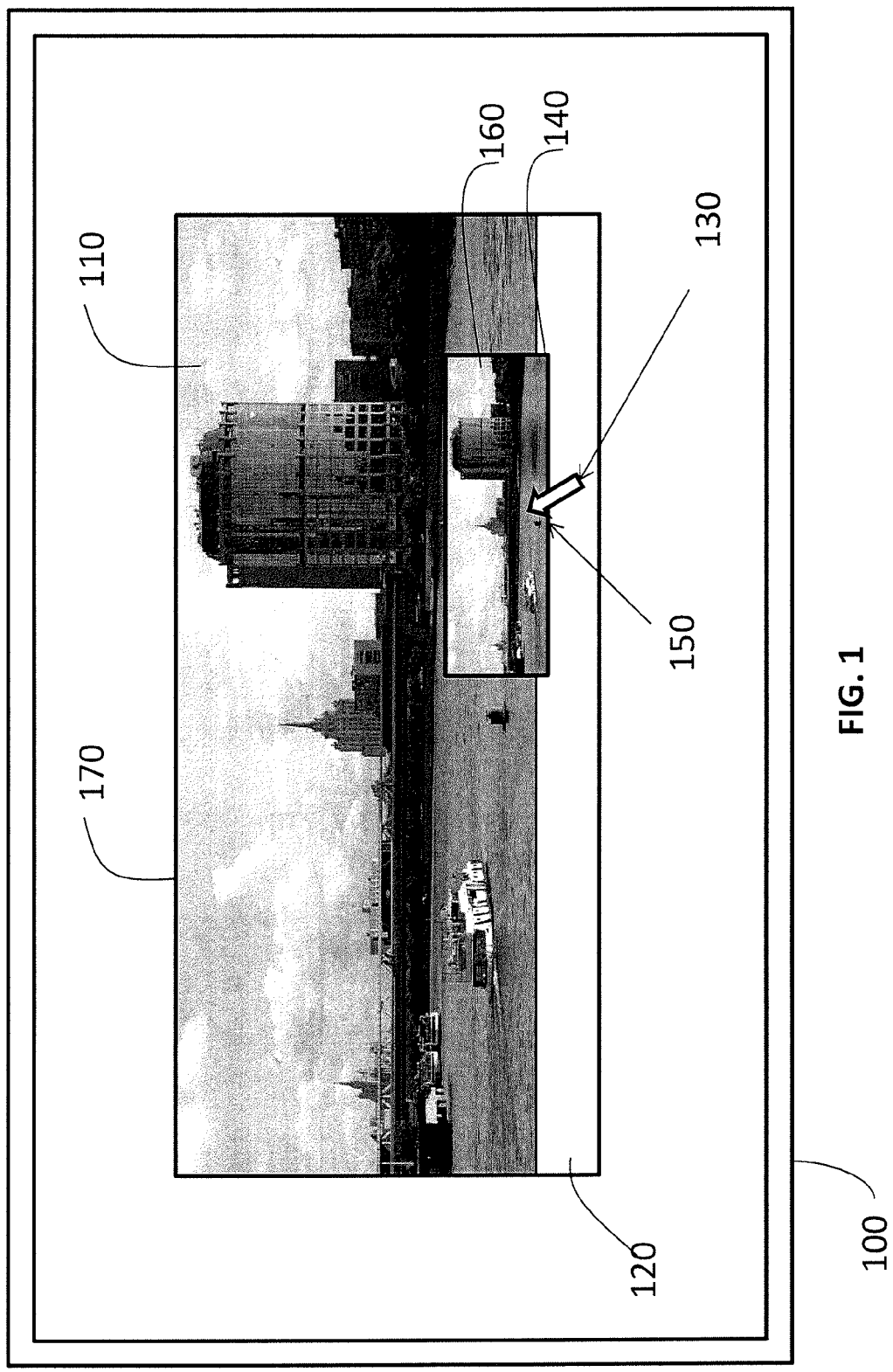
FIG. 1 is a diagram illustrating a preview of a video recording or video stream, according to various aspects of the current invention.

FIG. 1 is a diagram illustrating a preview of a video recording or video stream, according to various aspects of the current invention. In FIG. 1, video recording/stream 110 of first viewing window 170 may be viewed by a user on display screen 100 of an electronic device. In an aspect, video recording/stream 110 may be in a paused state where the video recording/stream is not currently playing, or in a playing state where the video recording/stream is currently playing.

According to various aspects, the user may move a cursor of an electronic input device over a time bar of the video recording/stream such that the cursor is placed over a location of the time bar corresponding to a time different than the current viewing time of the video recording/stream. As an example, cursor 130 may be moved such that it is placed over time 150 of time bar 120 corresponding to a time different than the current viewing time of video recording/stream 110. Further to the example, cursor 130 may be a cursor of an electronic input device such as, but not limited to, a computer mouse, a computer keyboard, a stylus, or the user itself. Still further to the example, time bar 120 may be a graphical representation of the total time duration of video recording/stream 110 and may display the amount of time elapsed since video recording/stream 110 started playing, the amount of time left for viewing video recording/stream 110, and/or the total time duration of video recording/stream 110. Further to the example, time 150 on time bar 120 may represent a graphical subsection of time bar 120 and may correspond to a time within video recording/stream 110.

According to various aspects, when cursor 130 is placed over a given time 150 on time bar 120, a second window 140 appears on display screen 100 of the electronic device, and a preview of video recording/stream 110, such as preview 160, may be displayed within second viewing window 140. In an aspect, second window 140 may appear on display screen 100 of the electronic device near cursor 130, within first viewing window 170, any other location within display screen 100 of the electronic device, or any combination thereof. In another aspect, preview 160 may be a video recording/stream that is a portion of video recording/stream 110. Further to the aspect, preview 160 may have a total time duration of any length of time, and may be shorter than the total time duration of video recording/stream 110. For example, preview 160 may be a video recording/stream of one second to several hours, with increments of a single second.

In a further aspect, portion 160 may start playing and stop playing at any time within video recording/stream 110. As an example, preview 160 may correspond to a portion of video recording/stream 110 that starts playing at time 150 selected by the user. As another example, preview 160 may correspond to a portion of video recording/stream 110 that stops playing at time 150 selected by the user. As a further example, preview 160 may correspond to a portion of video recording/stream 110, wherein preview 160 starts playing before and stops playing after the selected time 150.

Figure 2:
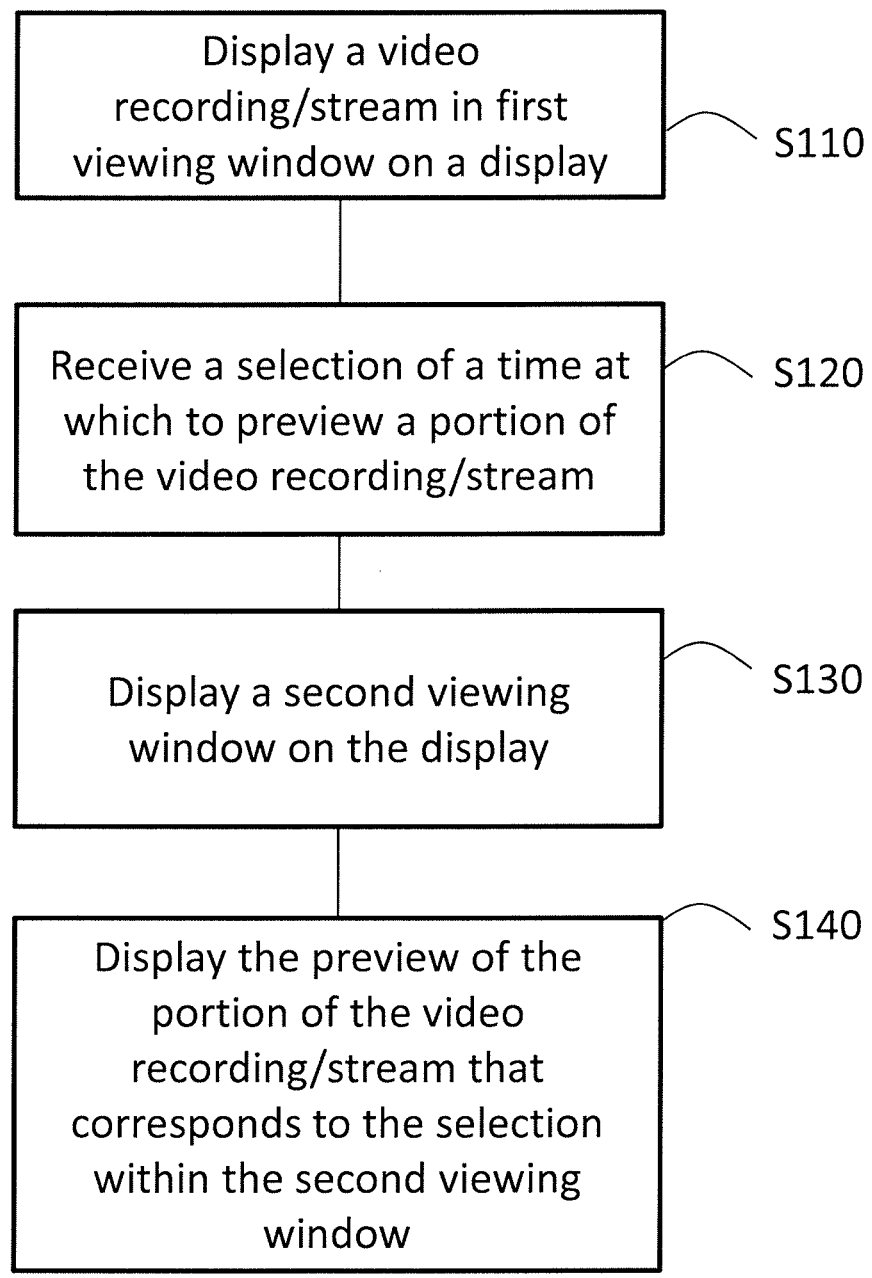
FIG. 2 is a flow chart illustrating a method for previewing a video recording or video stream, according to various aspects of the current invention.

FIG. 2 is a flow chart illustrating a method for previewing a video recording/stream, according to various aspects of the current invention. In FIG. 2, a video recording/stream is displayed in a first display window on a display of an electronic device at S110. In an aspect, the video recording/stream may be video recording/stream 110 of FIG. 1. In another aspect, the first display window may by first display window 170 of FIG. 1. In a further aspect, first display window 170 may include a time bar, such as time bar 120 of FIG. 1, that may indicate the amount of time elapsed since video recording/stream 110 started playing, the amount of time remaining in video recording/stream 110 to be played, and/or the total time duration of video recording/stream 110.

The method continues at S120, where a selection of a time at which to preview a portion of the video recording/stream is received. According to various aspects, if the user wishes to obtain a preview of a portion of a video recording/stream, the user may select the desired time by moving a cursor of an electronic input device over a time location of the time bar of the video recording/stream corresponding to the desired viewing time of the video recording/stream. In an aspect, cursor 130 may be moved such that it is placed over time 150 of time bar 120, which corresponds to a time different than the current viewing time of video recording/stream 110. Further to the example, cursor 130 may be a cursor of an electronic input device such as, but not limited to, a computer mouse, a computer keyboard, a stylus, or the user itself.

According to various aspects, when a selection at which to preview a portion of the video recording/stream is received at S120, a second viewing window may be displayed at a portion of the display screen of the electronic device, such as display screen 100 of FIG. 1, at S130. In an aspect, the second viewing window, such as second viewing window 140 of FIG. 1, may be smaller, equal, or larger in size than first viewing window 170. In another aspect, second viewing window 140 may be displayed near the proximity of cursor 130, at another location within first viewing window 170, at any other location within display screen 100, or any combination thereof.

According to various aspects, when the second viewing window is displayed at S130, a preview of a portion of the video recording/stream that corresponds to the selected time may be displayed within the second viewing window for a given duration of time at S140. In an aspect, preview 160 may be displayed within second viewing window 140, and may correspond to a portion of video recording/stream 110 that starts playing at time 150 selected by the user at S120. Further to the aspect, preview 160 may correspond to a portion of video recording/stream 110 that stops playing at time 150 selected by the user at S120. Still further to the aspect, preview 160 may correspond to a portion of video recording/stream 110, wherein preview 160 starts playing before and stops playing after time 150 selected by the user at S120.

In another aspect, the given duration of time for displaying preview 160 may be one or more seconds and up to several hours with intervals of a single second or less. In a further aspect, preview 160 may be displayed without sound, but may also be provided with sound. As a non-limiting example, the user of video recording/stream 110 may watch preview 160, which corresponds to a shorter portion of video recording/stream 110 corresponding to time 150 selected by the user on time bar 120 of first viewing window 110.

Figure 3:
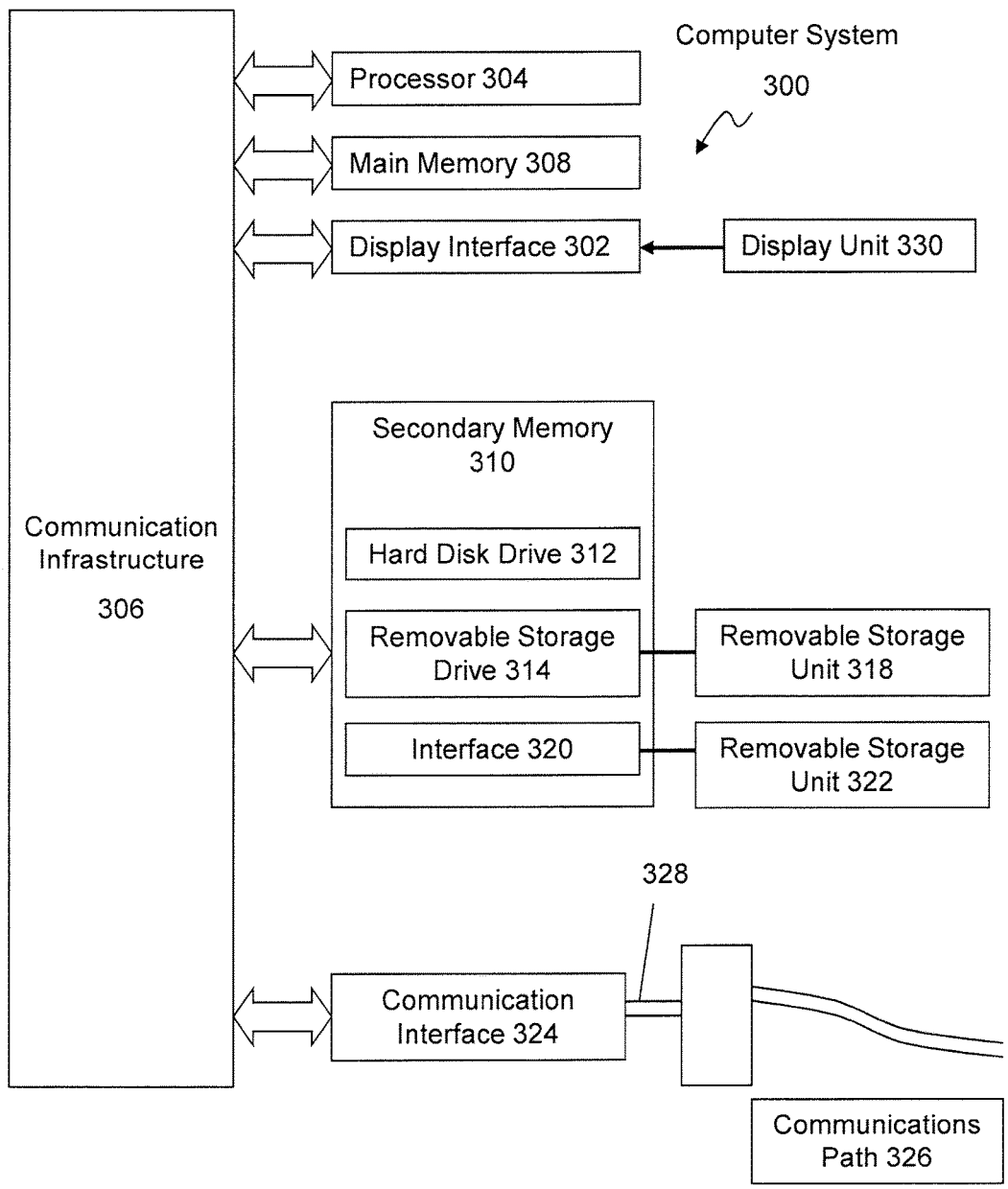
FIG. 3 is a diagram illustrating a system of various hardware components and other features, for use in accordance with an aspect of the present invention.

FIG. 3 presents an example system diagram of various hardware components and other features, for use in accordance with an aspect of the present invention. The present invention may be implemented using hardware, software, or a combination thereof and may be implemented in one or more computer systems or other processing systems. In one aspect, the invention is directed toward one or more computer systems capable of carrying out the functionality described herein. An example of such a computer system 300 is shown in FIG. 3.

Computer system 300 includes one or more processors, such as processor 304. The processor 304 is connected to a communication infrastructure 306 (e.g., a communications bus, cross-over bar, or network). Various software aspects are described in terms of this example computer system. After reading this description, it will become apparent to a person skilled in the relevant art(s) how to implement the invention using other computer systems and/or architectures.

Computer system 300 can include a display interface 302 that forwards graphics, text, and other data from the communication infrastructure 306 (or from a frame buffer not shown) for display on a display unit 330. Computer system 300 also includes a main memory 308, preferably random access memory (RAM), and may also include a secondary memory 310. The secondary memory 310 may include, for example, a hard disk drive 312 and/or a removable storage drive 314, representing a floppy disk drive, a magnetic tape drive, an optical disk drive, etc. The removable storage drive 314 reads from and/or writes to a removable storage unit 318 in a well-known manner. Removable storage unit 318, represents a floppy disk, magnetic tape, optical disk, etc., which is read by and written to removable storage drive 314. As will be appreciated, the removable storage unit 318 includes a computer usable storage medium having stored therein computer software and/or data.

In alternative aspects, secondary memory 310 may include other similar devices for allowing computer programs or other instructions to be loaded into computer system 300. Such devices may include, for example, a removable storage unit 322 and an interface 320. Examples of such may include a program cartridge and cartridge interface (such as that found in video game devices), a removable memory chip (such as an erasable programmable read only memory (EPROM), or programmable read only memory (PROM)) and associated socket, and other removable storage units 322 and interfaces 320, which allow software and data to be transferred from the removable storage unit 322 to computer system 300.

Computer system 300 may also include a communications interface 324. Communications interface 324 allows software and data to be transferred between computer system 300 and external devices. Examples of communications interface 324 may include a modem, a network interface (such as an Ethernet card), a communications port, a Personal Computer Memory Card International Association (PCMCIA) slot and card, etc. Software and data transferred via communications interface 324 are in the form of signals 328, which may be electronic, electromagnetic, optical or other signals capable of being received by communications interface 324. These signals 328 are provided to communications interface 324 via a communications path (e.g., channel) 326. This path 326 carries signals 328 and may be implemented using wire or cable, fiber optics, a telephone line, a cellular link, a radio frequency (RF) link and/or other communications channels. In this document, the terms "computer program medium" and "computer usable medium" are used to refer generally to media such as a removable storage drive 380, a hard disk installed in hard disk drive 370, and signals 328. These computer program products provide software to the computer system 300. The invention is directed to such computer program products.

Computer programs (also referred to as computer control logic) are stored in main memory 308 and/or secondary memory 310. Computer programs may also be received via communications interface 324. Such computer programs, when executed, enable the computer system 300 to perform the features of the present invention, as discussed herein. In particular, the computer programs, when executed, enable the processor 310 to perform the features of the present invention. Accordingly, such computer programs represent controllers of the computer system 300.

In an aspect where the invention is implemented using software, the software may be stored in a computer program product and loaded into computer system 300 using removable storage drive 314, hard drive 312, or communications interface 320. The control logic (software), when executed by the processor 304, causes the processor 304 to perform the functions of the invention as described herein. In another aspect, the invention is implemented primarily in hardware using, for example, hardware components, such as application specific integrated circuits (ASICs). Implementation of the hardware state machine so as to perform the functions described herein will be apparent to persons skilled in the relevant art(s).

In yet another aspect, the invention is implemented using a combination of both hardware and software.

Figure 4:
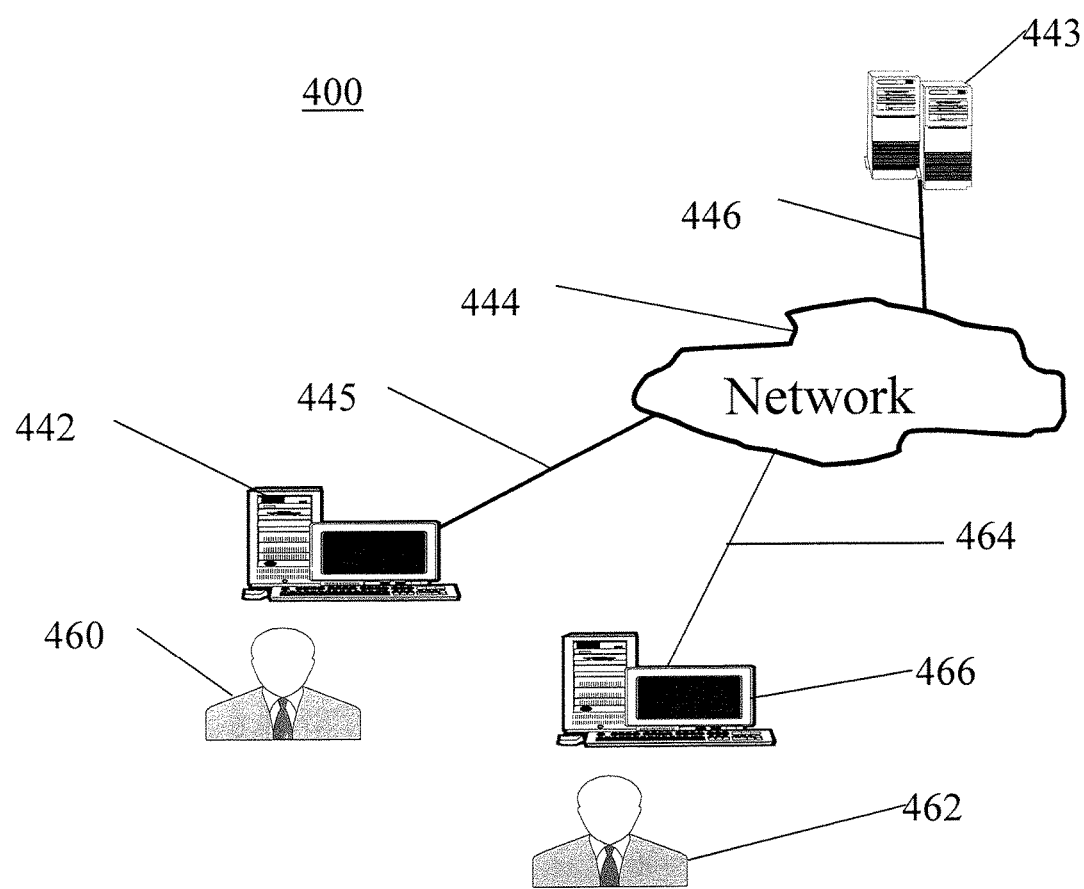
FIG. 4 is a block diagram of various example system components, in accordance with an aspect of the present invention.

FIG. 4 is a block diagram of various example system components, in accordance with an aspect of the present invention. FIG. 4 shows a communication system 400 usable in accordance with the present invention. The communication system 400 includes one or more accessors 460, 462 (also referred to interchangeably herein as one or more "users") and one or more terminals 442, 466. In one aspect, data for use in accordance with the present invention is, for example, input and/or accessed by accessors 460, 462 via terminals 442, 466, such as personal computers (PCs), minicomputers, mainframe computers, microcomputers, telephonic devices, or wireless devices, such as personal digital assistants ("PDAs") or a hand-held wireless devices coupled to a server 443, such as a PC, minicomputer, mainframe computer, microcomputer, smart phone, wireless tablet device, electronic personal digital assistant, or other device having a processor and a repository for data and/or connection to a repository for data, via, for example, a network 444, such as the Internet or an intranet, and couplings 445, 446, 464. The couplings 445, 446, 464 include, for example, wired, wireless, or fiberoptic links. In another aspect, the method and system of the present invention operate in a stand-alone environment, such as on a single terminal.

While aspects of this invention have been described in conjunction with the example features outlined above, various alternatives, modifications, variations, improvements, and/or substantial equivalents, whether known or that are or may be presently unforeseen, may become apparent to those having at least ordinary skill in the art. Accordingly, the example aspects of the invention, as set forth above, are intended to be illustrative, not limiting. Various changes may be made without departing from the spirit and thereof. Therefore, aspects of the invention are intended to embrace all known or later-developed alternatives, modifications, variations, improvements, and/or substantial equivalents.

We claim:

1. A method of displaying a preview of a portion of a video recording/stream, comprising:
   displaying a main video recording/stream in a first viewing window on a display;
   receiving a selection of a time within the main video recording/stream at which to preview a portion of the main video recording/stream, wherein the selection of the time at which to preview the portion of the main video recording/stream is indicated by moving a cursor of an electronic input device hovering over a location of a time bar of the main video recording/stream, wherein the time selection indicates at least one of a start time and an end time of previewing the portion of the main video recording/stream; and
   upon receiving a selection of a time:
   automatically creating a second viewing window on the display in proximity to the location of the cursor, wherein the second viewing window is created entirely within the first viewing window; and automatically generating and displaying an entirety of the preview of the portion of the main video recording/stream that corresponds to the selection within the second viewing window while concurrently displaying the main recording/stream in the first viewing window on the display behind the second viewing window, wherein the preview is a single contiguous portion of the main video recording/stream having a shorter duration than the main video recording/stream, and wherein the preview at least one of begins at the indicated start time and ends at the indicated end time, and includes a part of the main video recording/stream corresponding to the location on the time bar over which the cursor is hovering, wherein both the start time and the end time of the preview are within the main recording/stream, wherein the main recording/stream is a single and continuous video recording/stream.

2. The method of claim 1, wherein the electronic input device is selected from one of a computer mouse, a computer keyboard, a stylus, and the user.

3. The method of claim 1, wherein the second viewing window is smaller in size than the first viewing window.

4. The method of claim 1, further comprising continuing to display the preview within the second viewing window until the cursor is moved away from the location of the time bar of the main video recording/stream.

5. The method of claim 1, wherein the preview of the portion of the main video recording/stream is at least one second long.

6. A system for displaying a preview of a portion of a video recording/stream, the system comprising:
   a processor;
   a user interface functioning via the processor; and
   a repository accessible by the processor;
   wherein the processor is configured to
      display a main video recording/stream in a first viewing window on a display;
      receive a selection of a time within the main video recording/stream at which to preview a portion of the main video recording/stream, wherein the selection of the time at which to preview the portion of the main video recording/stream is indicated by moving a cursor of an electronic input device hovering over a location of a time bar of the main video recording/stream,
   wherein the time selection indicates at least one of a start time and an end time of previewing the portion of the main video recording/stream; and
   upon receipt of a selection of a time:
      automatically create a second viewing window on the display in proximity to the location of the cursor, wherein the second viewing window is created entirely within the first viewing window and smaller in size than the first viewing window;
      automatically display an entirety of the preview of the portion of the video recording/stream that corresponds to the selection within the second viewing window while concurrently displaying the main recording/stream in the first viewing window on the display behind the second viewing window, wherein the preview is a single contiguous portion of the main video recording/stream having a shorter duration than the main video recording/stream, and wherein the preview at least one of begins at the indicated start time and ends at the indicated end time, and includes a part of the main video recording/stream corresponding to the location on the time bar over which the cursor is hovering, wherein both the start time and the end time of the preview are within the main recording/stream, wherein the main recording/stream is a single and continuous video recording/stream.

7. The system of claim 6, wherein the preview stops playing at a time corresponding to the location on the time bar that is under the hovering cursor.

8. The system of claim 6, wherein the processor is housed on a terminal.

9. The system of claim 8, wherein the terminal is selected from a group consisting of a personal computer, a minicomputer, a main frame computer, a microcomputer, a hand held device, a wireless tablet device, a wireless communications device, and a wireless personal digital assistant device.

10. The system of claim 6, wherein the processor is housed on a server.

11. The system of claim 10, wherein the server is selected from a group consisting of a personal computer, a minicomputer, a microcomputer, and a main frame computer, a wireless tablet device, a wireless communications device, and a wireless personal digital assistant device.

12. A computer program product comprising a non-transitory computer usable medium having control logic stored therein for causing an electronic device to display a preview of a portion of a video recording/stream, the control logic comprising:
   computer readable program code means for displaying a main video recording/stream in a first viewing window on a display;
   computer readable program code means for receiving a selection of a time within the main video recording/stream at which to preview a portion of the main video recording/stream, wherein the selection of the time at which to preview the portion of the main video recording/stream is indicated by moving a cursor of an electronic input device hovering over a location of a time bar of the main video recording/stream, wherein the time selection indicates at least one of a start time and an end time of previewing the portion of the main video recording/stream; and
   computer readable program code means for:
      automatically creating and displaying a second viewing window on the display upon receiving a selection of a time while concurrently displaying the main recording/stream in the first viewing window on the display behind the second viewing window, wherein the second viewing window is in proximity to the selected time on the time bar, wherein the second viewing window is created entirely within the first viewing window and smaller in size than the first viewing window; and
      automatically displaying an entirety of the preview of the portion of the video recording/stream that corresponds to the selection within the second viewing window, wherein the preview is a single contiguous portion of the main video recording/stream having a shorter duration than the main video recording/stream, and wherein the preview at least one of begins at the indicated start time and ends at the indicated end time, and includes a section of the main video recording/stream corresponding to the location on the time bar that is under the hovering cursor, wherein both the start time and the end time of the preview are within the main recording/stream, wherein the main recording/stream is a single and continuous video recording/stream.

\* \* \* \* \*